(12) United States Patent
Brice

(10) Patent No.: US 7,032,644 B2
(45) Date of Patent: Apr. 25, 2006

(54) HIGH STRENGTH ALUMINUM ALLOY AND METHOD OF PRODUCING SAME

(75) Inventor: Craig A. Brice, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 263 days.

(21) Appl. No.: 10/646,277

(22) Filed: Aug. 22, 2003

(65) Prior Publication Data
US 2004/0188053 A1  Sep. 30, 2004

Related U.S. Application Data

(60) Provisional application No. 60/405,646, filed on Aug. 23, 2002.

(51) Int. Cl.
*B22D 11/00* (2006.01)

(52) U.S. Cl. ........................ 164/461; 164/55.1; 164/46

(58) Field of Classification Search ................ 164/460, 164/461, 46, 55.1; 219/121.63, 121.64
See application file for complete search history.

(56) References Cited

U.S. PATENT DOCUMENTS

| | | | |
|---|---|---|---|
| 4,661,172 A | 4/1987 | Skinner et al. | |
| 4,923,532 A | 5/1990 | Zedalis et al. | |
| 5,030,517 A | 7/1991 | Gilman et al. | |
| 5,597,529 A | 1/1997 | Tack | |
| 5,624,632 A | 4/1997 | Baumann et al. | |
| 5,837,960 A * | 11/1998 | Lewis et al. ............ | 219/121.63 |
| 5,882,449 A | 3/1999 | Waldron et al. | |
| 6,476,343 B1 * | 11/2002 | Keicher et al. ......... | 219/121.63 |
| 6,727,459 B1 * | 4/2004 | Bialach ................. | 219/121.64 |

OTHER PUBLICATIONS

"*Direct Laser Dposition of Alloys from Elemental Powder Blends*", Scripta Materialia (2001).
"*Characterization of Laser-Deposited TiAl Alloys*", Scripta Materialia (2001).
"*Laser-Deposited Advanced Materials*", Journal of Advanced Materials (2001).
"*In Situ Deposition of Ti-TiB Composites Using Lens*", Metal Powder Deposition for Rapid Manufacturing, Proceedings of the International Conference on Metal Powder Deposition for Rapid Manufacturing, San Antonio, TX, Apr. 8-10, 2002.
"*Characterization of Laser-Deposited TiAl Alloys*", Materials Research Society Symposium Proceedings (1999).
"*Précis de Construction Mécanique. Tome 1: Dessin, Conception et Normalisation*", 1978 Construction Mecanique.

(Continued)

*Primary Examiner*—Kevin Kerns
*Assistant Examiner*—I.-H. Lin
(74) *Attorney, Agent, or Firm*—Bracewell & Giuliani LLP

(57) ABSTRACT

An alloy of aluminum, lithium, magnesium, zirconium, and scandium is formed with a rapid solidification process to retain desired metastable phases. A solid freeform fabrication device uses a heat source to melt a feedstock delivered through one or more guide nozzles. The heat source and the nozzles are mounted to a movable platform that positions the heat source and the nozzles in a desired location for each section or layer of the part being formed. The nozzles are located at 90° increments in an array having a selected radius from, and being centered on the heat source. The device forms adjacent, side-by-side layers to form the width of the part, and is used to form adjacent, stacked layers to create the height of the part.

22 Claims, 2 Drawing Sheets

OTHER PUBLICATIONS

*Custom Aluminum Alloy for Direct Deposition Techniques* by Craig A. Brice, Mar. 7, 2001, Lockheed Martin Proprietary Information.

*Weldability of Li-Bearing Aluminium Alloys* by A. Kostrivas and J.C. Lippold, International Materials Reviews 1999 vol. 44, No. 6.

*Weldable Aluminium Alloys With Scandium (Review)* by A. Ya. Ishchenko and T.M. Labur, The Paton Welding Journal 1998 10 (8) 389-392.

*Examining the Efficiency of Hardening the Weld Metal With Scandium in Welding 1420 Aluminium-Lithium Alloy* by T.M. Labur, The Paton Welding Journal 1996 8 (7) 391-393.

*Prospects for Using Welding in Construction of New Generation Aircraft* by B.E. Paton, A. Ya. Ishchenko and K.A. Yushchenko, A.G. Bratukhin, A.G. Vovnyanko, E.T. Vasilevskii and A.G. Molyar, The Paton Welding Journal 1996 8 (6) 343-344.

*Welding Technology and Properties of Welded Joints in Aluminium-Lithium Alloys (Review)* by A. Ya. Ishchenko and T.M. Labur, The Paton Welding Journal 1998 10 (7) 360-364.

*Scandium in Aluminum Alloys* by Lawrence S. Kramer and William T. Tack, Micky T. Fernandes, Advanced Materials & Processes Oct. 1997.

*Mechanical Properties and Microstructures of Al-Mg-Sc Alloys* by Ralph R. Sawtell and Craig I. Jensen, Metallurgical Transactions A, vol. 21A, Feb. 1990—421.

*The Effect of Small Additions of Scandium on the Properties of Aluminium Alloys* by B.A. Parker, Z.F. Zhou, P. Nolle, Journal of Materials Science 30 (1995) 452-458, Chapman & Hall 1995, 0022-2461.

* cited by examiner

HIGH STRENGTH ALUMINUM ALLOY AND METHOD OF PRODUCING SAME

The present patent application claims priority to U.S. Provisional Patent Application Ser. No. 60/405,646, which was filed on Aug. 23, 2002.

BACKGROUND OF THE INVENTION

1. Technical Field

The present invention relates in general to an improved composition of matter and, in particular, to an improved system, method, and apparatus for forming a novel composition of matter comprising an alloy of aluminum, lithium, magnesium, zirconium, and scandium.

2. Description of the Related Art

Metal objects are currently produced by thermomechanical processes, which include casting, rolling, stamping, forging, extrusion, machining, and joining operations. Multiple steps are required to produce a finished article. These conventional operations often require the use of heavy equipment and molds, tools, and dies. For example, a typical process sequence required to form a small cylindrical pressure vessel might include casting an ingot, heat treating and working the casting to homogenize it by forging or extrusion or both, then machining a hollow cylinder and, separately, end caps from the worked ingot and, finally, welding the end caps to the cylinder.

Conventional production methods are subtractive in nature in that material is cut away from a starting block of material to produce a more complex shape. Subtractive machining methods are deficient in many respects. Large portions of the starting material are reduced to waste in the form of cuttings. These methods produce waste materials, such as metal cuttings, oils, and solvents, which must be further processed for purposes of reuse or disposal. The articles produced are contaminated with cutting fluids and metal chips. They require cutting tools, which wear and must be periodically reconditioned and ultimately replaced. Fixtures for use in manufacturing must be designed, fabricated, and manipulated during production.

When a part is unusual in shape or has internal features, machining is more difficult. Choosing the machining operations to be used and the sequence of operations requires a high degree of experience. A number of different machines are needed to provide capability to perform the variety of operations, which are often required to produce a single article. Sophisticated machine tools require a significant capital investment and occupy a good deal of space. Use of the invention in place of subtractive machining provides solutions to these problems and disadvantages.

Another difficulty with conventional machining techniques is that many objects must be produced by machining a number of parts and then joining them together. Producing parts separately and joining them requires close tolerance machining of matching parts, provision of fastening means, such as threaded connections, and welding together of components. These operations involve a significant portion of the cost of producing an article, as they require time for design and production as well as apparatus for performing them.

Aluminum has been used extensively in aerospace and other manufacturing applications due to its high strength-to-weight ratio. To increase the usefulness of aluminum, various aluminum alloys have been produced, many being tailored to provide desired characteristics, such as increased fracture toughness. Common alloying elements include lithium, magnesium, copper, and scandium. However, the equilibrium solute levels (as measured in wt. %) in conventionally processed aluminum alloys are below that which maximizes the beneficial effect of the solute.

To increase the amount of solute levels in the alloys, rapid solidification processes (RSP) can be used. In these processes, a rapid quenching is used in freezing the alloy from a molten state, the solutes remaining in desired phases. After quenching, diffusion may allow for dispersion throughout the material and agglomeration at nucleation sites, further improving the characteristics of the alloy. While this type of process is widely used, the resulting product is typically in powder, flake, or ribbon forms, which are unsuitable for manufacturing applications requiring material in bulk form. Thus, an improved alloy and apparatus, system, and method of producing materials that avoids or eliminates many of the disadvantages of the prior art are needed and would be desirable.

SUMMARY OF THE INVENTION

One embodiment of the present invention comprises a novel composition of matter that is an alloy of aluminum, lithium, magnesium, zirconium, and scandium. The alloy of the present invention requires a rapid solidification process to retain the desired metastable phases. In addition, a method of direct manufacturing is disclosed that results in rapid solidification. A solid freeform fabrication device uses a high energy density heat source, such as a laser for example, for melting a feedstock. The feedstock may comprise, for example, a metallic powder that may be delivered through one or more guide nozzle(s). The feedstock exits the nozzle(s) through an outlet at the lower end of each nozzle.

The controls for the heat source and the nozzle(s) are mounted to a movable platform. In the laser embodiment, the controls utilize optics to direct the laser beam. The platform is computer-controlled to position the heat source and the nozzle(s) in a desired location for each section or layer of the part being formed. In one embodiment, the nozzles are located at 90° increments in an array having a selected radius from, and being centered on the laser.

To form a part using the device, the feedstock metal is delivered into and through the nozzle(s). When metallic powder is used as the feedstock, the metallic powder is entrained in a gas, typically argon, for delivery via the nozzle(s). The feedstock metal is carried out of the exit of each nozzle and directed at a point where the stream(s) of metal converge with the heat source. The heat source melts the metal to form a molten pool on a substrate. As the platform for the heat source and the nozzle(s) is moved, the pool rapidly cools and solidifies when the heat source is moved away, forming a continuous line of deposited metal. The device is used to form adjacent, side-by-side layers to form the width of the part, and is used to form adjacent, stacked layers to create the height of the part.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

The present invention is directed to a novel composition of matter comprising an aluminum alloy and a method for producing the alloy. This new alloy is ideally suited for use in applications, such as aerospace applications, that require a combination of high strength and high fracture toughness. To enable formation of this new composition of matter, the preferred method of producing the alloy utilizes a solid freeform fabrication (SFF), or direct deposition, device to achieve rapid cooling and solidification while forming a bulk part.

Figure 1:
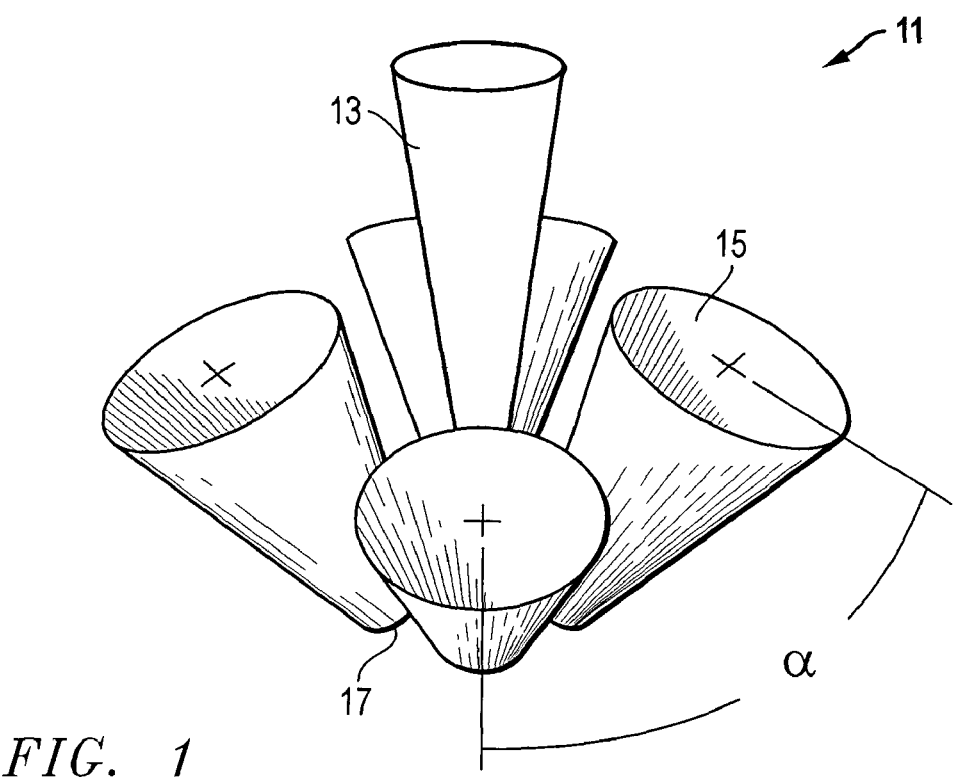
FIG. 1 is a schematic, perspective view of a portion of a solid freeform fabrication device.

The alloy of the present invention requires a rapid solidification process (RSP) to retain the desired metastable phases, and a method of direct manufacturing that results in rapid solidification is shown in the figures. FIG. 1 is a schematic, perspective view of a portion of a SFF device 11, such as is available from Optomec Design Company, Albuquerque, N.Mex., and sold under the trademark LENS™ (Laser Engineered Net Shaping).

Device 11 comprises a high energy density heat source, such as a laser beam 13. Other forms of heat sources may include, for example, electron beams and arcs, as illustrated at step 301 in FIG. 3. The laser beam 13 may be formed by various laser types and delivered to the desired location by fixed or fiber optics. Beam 13 acts as the heat source for melting a feedstock, such as a metallic powder. Other types of feedstock may include wire, for example. The feedstock is delivered through one or more guide nozzle(s) 15 (four shown), as depicted at step 305 in FIG. 3. The feedstock or powder exits nozzles 15 through an outlet 17 at the lower end of each nozzle 15.

Figure 3:
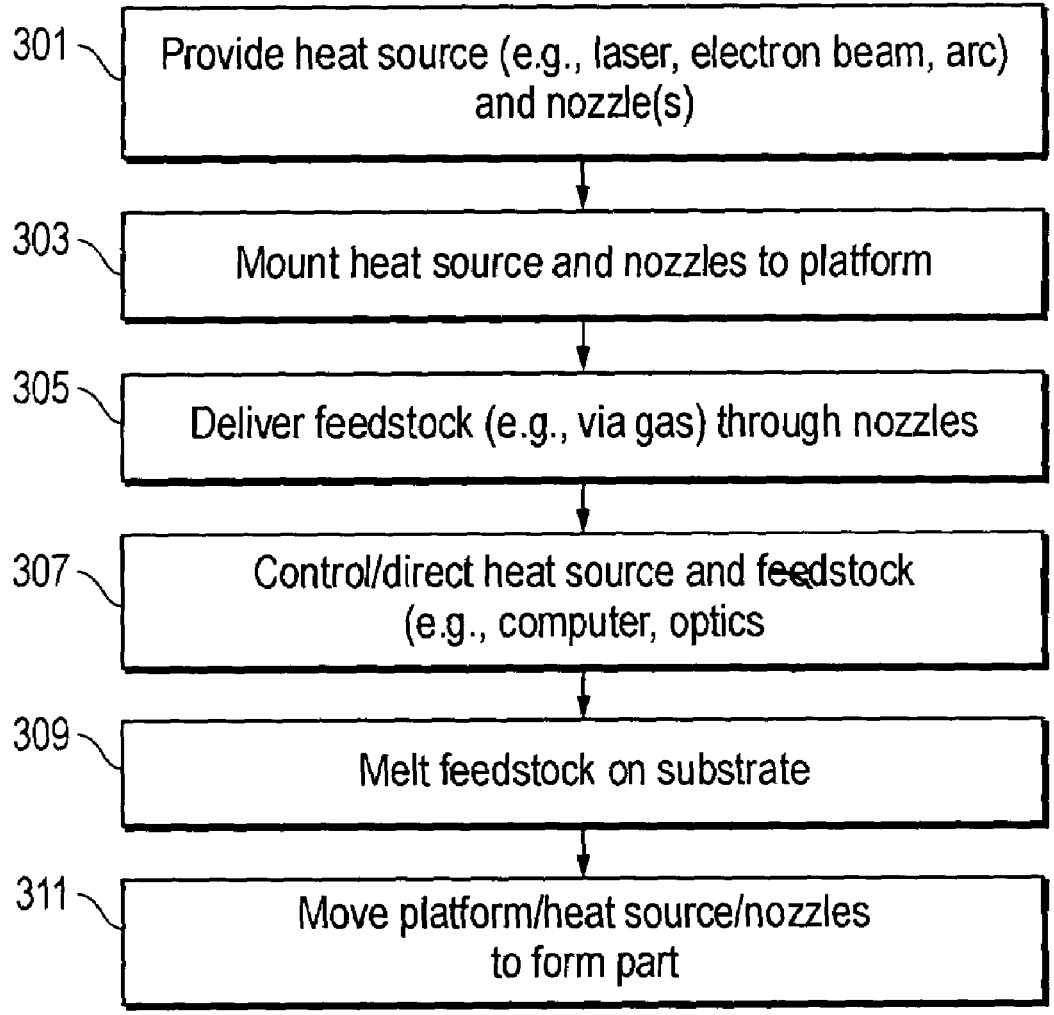
FIG. 3 is a flowchart of one embodiment of a method of the present invention.

In one embodiment, the controls for beam 13 or heat source and nozzles 15 are mounted to a movable platform, as depicted in step 303 in FIG. 3. In the laser embodiment, the controls utilize optics to direct the laser beam 13. The platform is computer-controlled to position the beam 13 and nozzles 15 in a desired location for each section or layer of the part being formed. These portions of the method are illustrated at step 307 in FIG. 3. Device 11 is shown as having four nozzles 15 located at 90° increments in an array having a selected radius from, and being centered on, beam 13. Though shown with four nozzles 15, device 11 may have more or fewer nozzles 15, and the nozzles 15 may be arranged in various orientations.

Figure 2:
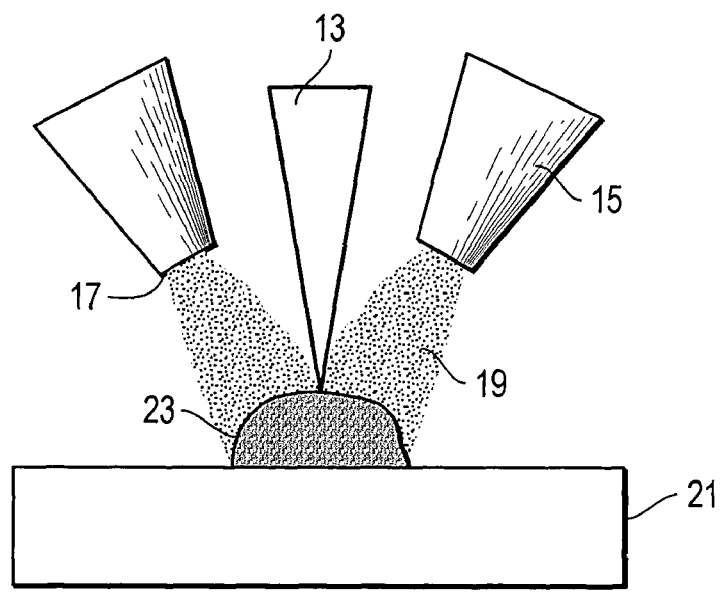
FIG. 2 is a schematic front view of the device of FIG. 1 during fabrication of a part.

To form a part using the device 11, the feedstock metal is delivered into and through the nozzles 15. As shown in FIG. 2, when the powdered metal 19 is used as the feedstock, the metallic powder is entrained in a gas, typically argon, for delivery via the nozzles (step 305, FIG. 3). The feedstock metal is carried out of the exit 17 of each nozzle 15 and directed at a point where the stream(s) of the metal 19 converge with the heat source or beam 13. The laser beam 13 melts the metal 19 (step 309, FIG. 3), forming a molten pool on substrate 21. As the platform for the beam 13 and the nozzles 15 is moved (step 311, FIG. 3), the pool rapidly cools and solidifies. When the heat source or beam 13 is moved away, a continuous line of deposited metal 19 forms a portion of part 23. Device 11 is used to form adjacent, side-by-side layers to form the width of the part, and is used to form adjacent, stacked layers to create the height of part 23.

The present invention comprises a novel composition of matter that is an alloy of a selected group of metals including aluminum, lithium, magnesium, zirconium, and scandium. The contribution of each of these elements is discussed below in detail. Unless otherwise indicated, amounts of solute are discussed herein in terms of the percentage of weight of the alloy.

In general, the properties sought to be improved in the alloy of the invention are density, strength, fracture toughness, and weldability. By minimizing density, weight savings can be achieved while providing the same or additional strength in a structure. Increased strength allows for use of less material in components, allowing for further weight savings. Increased fracture toughness is desired for limiting crack growth during the fatigue to which aerospace structures are subjected. Increasing weldability can limit problems, such as porosity and crack formation due to shrinkage.

Several benefits are realized with the addition of lithium as an alloying element in aluminum, including a reduction in density and an increase in the elastic modulus, the latter of which has been shown to result in a lower fatigue crack growth rate. The maximum solubility of lithium in aluminum is approximately 4% at the eutectic temperature (approximately 600° C.). The equilibrium compound is AlLi, a cubic structure, whereas solution treating to dissolve the lithium and followed by aging causes precipitation of a metastable phase, $Al_3Li$, which is a face-centered cubic structure and coherent with the aluminum matrix. By utilizing a RSP, such as by forming a part using SFF device 11, the metastable phase dominates the equilibrium phase. Since the metastable phase is shearable, planar slip is exhibited upon deformation, increasing the fracture toughness of the aluminum. The alloy of the invention has a weight percentage of lithium of approximately 3% or greater, but preferably 2% to 4%.

The addition of magnesium also reduces the density of the alloy. With solid solubility in aluminum of about 4%, magnesium also adds strength, mainly through substitutional solid solution. An additional benefit of magnesium in aluminum alloys is that it reduces the solubility of lithium in aluminum, forcing the precipitation of more of the desired $Al_3Li$ phase. Magnesium has been shown to improve corrosion resistance and also improves weldability of aluminum alloys by reducing hot cracking and increasing weldment strength. The alloy of the invention has a weight percentage of magnesium of approximately 4% or greater, but preferably 3% to 5%.

Zirconium additions have been to shown to improve tensile strength by forming grain-boundary pinning precipitates. Zirconium has a low solubility in aluminum of approximately 0.28% at the peritectic and has a low diffusion coefficient. When added to aluminum, zirconium forms two face-centered cubic structures, $Al_3Zr$ and $Al_3(Zr, Li)$, which are similar to the metastable $Al_3Li$ phase. However, these phases have higher coherent mismatch strains and higher anti-phase boundary energy, and these factors combine to cause a reduction of particle cutting by dislocations and a reduction of overall slip planarity, improving tensile strength. $Al_3Zr$ also has the added benefits of forming nucleation sites for $Al_3Li$, creating a shell-like precipitate structure, and of segregating to the grain boundaries, which effectively pins the grains and raises the recrystallization temperature. The alloy of the invention has a weight percentage of zirconium in the range of approximately 0.25% to 1.0% and, preferably, about 0.5%.

Scandium is a highly desirable solute in an aluminum alloy, increasing strength and fracture toughness without the increased density associated with using other, heavier alloying elements. Alloyed with aluminum, scandium has a low diffusion coefficient, inhibiting coarsening, and forms $Al_3Sc$, with the same coherent, face-centered cubic structure as $Al_3Li$ and $Al_3Zr$. These dispersoids have a high mismatch strain, providing greater strengthening per weight percentage than lithium or zirconium. Scandium also raises the recrystallization temperature, resulting in improved high-temperature stability. The $Al_3Sc$ phase also provides nucleation sites for $Al_3Li$ precipitation and improves weldability.

Typical processing methods allow for a maximum wt. % of scandium in aluminum of approximately 0.5%. However, a higher amount of scandium is desired for maximizing the improved characteristics of the alloy. An RSP method, such as the direct deposition technique described above, allows for increased solubility and improved distribution of the scandium in the alloy, greatly increasing its effectiveness as a strengthener. The alloy of the invention has a weight percentage of scandium of approximately 1.0% or greater, but preferably about 0.6% to 1.5%.

Based on the above description, one example of the aluminum alloy of the present invention contains approximately 4.0% magnesium, 3.0% lithium, 1.0% scandium, and 0.5% zirconium. This alloy provides the advantages of a decrease in density, an increase in tensile strength, an increase in fracture toughness, and improved weldability. The alloy may be used with direct deposition, SFF processes for creating a bulk product having superior properties.

While the invention has been described in only one of its forms, it should be apparent to those skilled in the art that it is not so limited, but is susceptible to various changes without departing from the scope of the invention.

What is claimed is:

1. A method of forming an aluminum alloy, comprising:
   (a) providing a heat source and a nozzle;
   (b) delivering a feedstock through the nozzle, the feedstock comprising aluminum and at least one alloy element in a quantity that is greater than an equilibrium solute level for the alloy element in aluminum;
   (c) directing the feedstock through the nozzle to a point where the feedstock converges with the heat source;
   (d) melting the feedstock with the heat source to form a molten pool on a substrate; and
   (e) moving the heat source and the nozzle away from the molten pool, such that the molten pool rapidly cools and solidifies to form a continuous line of deposited alloy to form a part, the rapid cooling causing the alloy element to alloy within the aluminum of the part at a level greater than the equilibrium solute of the alloy element within the aluminum.

2. The method of claim 1, wherein step (a) comprises providing the heat source as a laser that is directed by fiber optics.

3. The method of claim 1, wherein step (a) comprises providing the heat source as an electron beam.

4. The method of claim 1, wherein step (a) comprises providing the heat source as an arc.

5. The method of claim 1, further comprising the step of controlling the heat source with optics and a computer to position the heat source and the nozzle in a desired location for multiple sections and layers of the part being formed.

6. The method of claim 1, wherein said at least one alloy element n step (b) comprises at least 0.6% by weight of scandium.

7. The method of claim 6, wherein said at least one alloy element in step (b) comprises at least 0.5% by weight of zirconium.

8. The method of claim 1, wherein said at least one alloy element in step (b) comprises 0.6%–1.5% by weight of scandium and at least 0.5% of zirconium.

9. The method of claim 8, wherein in addition to said at least one element in a quantity greater than its equilibrium solute, the feedstock of step (b) further comprises 2%–4% by weight of lithium, 3%–5% of magnesium.

10. The method of claim 1, wherein step (e) comprises forming the part with adjacent, side-by-side layers to form a width of the part, and adjacent, stacked layers to form a height of the part.

11. The method of claim 1, wherein step (b) comprises providing the feedstock as a metallic powder.

12. The method of claim 1, wherein step (b) comprises providing the feedstock as a metallic wire.

13. A method of forming an aluminum alloy, comprising:
   (a) providing a heat source and a plurality of nozzles;
   (b) mounting the heat source and the nozzles to a movable platform;
   (c) delivering a metallic powder through the nozzles, the powder comprising aluminum and at least one alloy element in a quantity that is greater than an equilibrium solute level for the alloy element in aluminum;
   (d) directing the metallic powder through the nozzles to a point where streams of the metallic powder converge with the heat source;
   (e) melting the metallic powder with the heat source to form a molten pool on a substrate; and
   (f) moving the platform for the heat source and the nozzles away from the molten pool, such that the molten pool rapidly cools and solidifies to form a continuous line of deposited alloy to form a part, the rapid cooling causing the alloy element to alloy within the aluminum of the part at a level in excess of its equilibrium solute level.

14. The method of claim 13, wherein step (a) comprises providing the heat source as a laser that is directed by fiber optics.

15. The method of claim 13, wherein step (a) comprises providing the heat source as an electron beam.

16. The method of claim 13, wherein said at least one alloy element of step (c) comprises scandium and zirconium, and in addition to said at least one element in a quantity greater than its equilibrium solute, the powder of step (c) further comprises lithium and magnesium.

17. The method of claim 13, wherein said at least one alloy element in step (c) comprises at least 1.0% by weight of scandium.

18. The method of claim 13, wherein said at least one alloy element in step (c) comprises at least 0.5% by weight of zirconium.

19. The method of claim 13, wherein said at least one alloy element in step (c) comprises 0.6%–1.5% by weight of scandium and at least 0.5% of zirconium.

20. The method of claim 13, wherein step (f) comprises forming the part with adjacent, side-by-side layers to form a width of the part, and adjacent, stacked layers to form a height of the part.

21. A method of forming an aluminum alloy part, comprising:
   (a) providing a heat source and a plurality of nozzles;
   (b) mounting the heat source and the nozzles to a movable platform;
   (c) delivering a metallic powder through the nozzles, the powder comprising aluminum and scandium in a quantity that is greater than an equilibrium solute level of scandium in aluminum;
   (d) directing the metallic powder through the nozzles to a point where streams of the metallic powder converge with the heat source;
   (e) melting the metallic powder with the heat source to form a molten pool on a substrate; and
   (f) moving the platform for the heat source and the nozzles away from the molten pool, such that the molten pool rapidly cools and solidifies to form a continuous line of deposited alloy to form a part, the rapid cooling causing the scandium to form an alloy within the aluminum of the part at a quantity greater than the equilibrium solute level of scandium in aluminum.

22. The method according to claim 21, wherein the quantity of scandium in step (b) comprises at least 1.0% by weight.

* * * * *